United States Patent

Toyomaki

(10) Patent No.: US 8,805,194 B2
(45) Date of Patent: Aug. 12, 2014

(54) OPTICAL TRANSMISSION DEVICE AND OPTICAL SWITCH DEVICE

(75) Inventor: Takashi Toyomaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 74 days.

(21) Appl. No.: 13/429,767

(22) Filed: Mar. 26, 2012

(65) Prior Publication Data

US 2012/0263463 A1  Oct. 18, 2012

(30) Foreign Application Priority Data

Apr. 18, 2011 (JP) ................................. 2011-092369

(51) Int. Cl.
*H04B 10/00* (2013.01)
*H04J 14/02* (2006.01)
*H04B 10/077* (2013.01)
*H04B 10/2513* (2013.01)

(52) U.S. Cl.
CPC ......... *H04J 14/0212* (2013.01); *H04J 14/0284* (2013.01); *H04B 10/0775* (2013.01); *H04B 10/2513* (2013.01)
USPC .......................................... 398/136; 398/181

(58) Field of Classification Search
USPC .......................................................... 398/30
See application file for complete search history.

(56) References Cited

U.S. PATENT DOCUMENTS

| | | | | |
|---|---|---|---|---|
| 5,850,305 A | * | 12/1998 | Pidgeon | 398/193 |
| 6,055,082 A | | 4/2000 | Chikuna | |
| 6,748,150 B1 | * | 6/2004 | Dutta et al. | 385/123 |
| 2006/0049869 A1 | * | 3/2006 | Meng et al. | 330/10 |
| 2006/0147205 A1 | * | 7/2006 | Raddatz | 398/30 |
| 2007/0297804 A1 | | 12/2007 | Honda et al. | |
| 2009/0097866 A1 | * | 4/2009 | Nakamura | 398/208 |
| 2009/0175629 A1 | * | 7/2009 | Liu et al. | 398/147 |
| 2009/0297154 A1 | * | 12/2009 | Izumi | 398/81 |
| 2012/0189320 A1 | * | 7/2012 | Zelensky et al. | 398/158 |

FOREIGN PATENT DOCUMENTS

| | | |
|---|---|---|
| JP | 10-163962 | 6/1998 |
| JP | 2008-10971 | 1/2008 |

OTHER PUBLICATIONS

Masahiro Daikoku, "Polarization Mode Dispersion Suppression Technique for Super-High Speed Light Signal in Laid Optical Transmission Path", Feb. 2008.

* cited by examiner

*Primary Examiner* — David Payne
*Assistant Examiner* — Casey Kretzer
(74) *Attorney, Agent, or Firm* — Staas & Halsey LLP

(57) ABSTRACT

An optical transmission device includes a signal generator configured to generate a first signal corresponding to an amount of residual chromatic dispersion that occurs in a light signal transmitted from the optical transmission device to a downstream device, and a superimposer configured to superimpose the first signal on the light signal transmitted from the optical transmission device and transmit the light signal superimposed by the first signal to the downstream device.

10 Claims, 13 Drawing Sheets

FIG. 7

| RESIDUAL DISPERSION VALUE | FREQUENCY |
|---|---|
| 0 | 0 |
| 1 | 1 |
| 2 | 2 |
| 3 | 3 |
| 4 | 4 |
| 5 | 5 |
| ⋮ | ⋮ |
| 127 | 127 |
| -128 | 128 |
| -127 | 129 |
| -126 | 130 |
| ⋮ | ⋮ |
| -1 | 255 |

FIG. 11A

| RESIDUAL DISPERSION VALUE | FREQUENCY |
|---|---|
| 0 – 50 | fo |
| 51 – 100 | 2*fo |
| 101 – 150 | 3*fo |
| ⋮ | ⋮ |

FIG. 11B

| RESIDUAL DISPERSION VALUE | FREQUENCY |
|---|---|
| 0 – 50 | fo |
| 51 – 100 | 2*fo |
| 101 – 150 | 3*fo |
| ⋮ | ⋮ |
| -1 – -50 | 15*fo |
| -51 – -100 | 14*fo |
| -101 – -150 | 13*fo |
| ⋮ | ⋮ |

OPTICAL TRANSMISSION DEVICE AND OPTICAL SWITCH DEVICE

CROSS-REFERENCE TO RELATED APPLICATION

This application is based upon and claims the benefit of priority of the prior Japanese Patent Application No. 2011-092369, filed on Apr. 18, 2011, the entire contents of which are incorporated herein by reference.

FIELD

The embodiments discussed herein are related to an optical transmission device and an optical switch device.

BACKGROUND

In a wavelength division multiplexing (WDM) optical network currently used, there are plural paths in many cases until reaching a destination because the optical network has a mesh-like intricately complex configuration. Accordingly, plural candidates for a bypassing path (backup line) exist when a currently used line has failed. Thus, the WDM optical network currently used may have a good network configuration adaptable for, e.g., secondary and tertiary failures.

On the other hand, an optical fiber accompanies a factor that degrades a transmission signal, the factor being called "chromatic dispersion". To avoid such degradation of the transmission signal, dispersion compensation is generally performed on wavelengths of signal light at each relay site with batch processing in, e.g., long-distance transmission over many spans. Examples of the relay site include an optical add-drop multiplexer (OADM) node and an in-line amplifier (ILA) node.

One of references regarding the related art is DAIKOKU Masahiro, "Polarization Mode Dispersion Suppression Technique for Super-High Speed Light Signal in Laid Optical Transmission Path", February 2008.

Another related-art technique is disclosed in Japanese Laid-open Patent Publication No. 2008-010971.

However, when a signal of the type less endurable to the chromatic dispersion in 40G phase modulation is transmitted, for example, the chromatic dispersion is not sufficiently compensated for in some channel with the above-described batch compensation of the chromatic dispersion alone. Accordingly, the signal is further compensated individually for each wavelength depending on an amount of a total chromatic dispersion after having passed through a network (hereinafter referred to as "residual chromatic dispersion"). Thus, the signal is appropriately compensated such that the chromatic dispersion is held within a tolerance range enabling the signal to be received by a receiver. When a failure occurs in the network and the path is changed over to a bypassing path, the residual chromatic dispersion is changed and individual degrees of chromatic dispersion compensations are also changed. This raises the problem that the transmitted signal is not received by the receiver and an error state continues until the individual compensations are optimized.

Meanwhile, if a value of the residual chromatic dispersion in the bypassing path, which is to be taken in the occurrence of a failure, is known in advance, the individual degrees of chromatic dispersion compensations can be properly set as soon as the communication path is changed to the bypassing path. In more detail, when there is one bypassing path, for example, the individual extent of chromatic dispersion compensation can be properly set in a moment by preparing respective residual chromatic dispersion values for the currently used path and the bypassing path. In a mesh network, however, because the bypassing path is present in plural or infinite number, it is not practical to prepare respective residual chromatic dispersion values for the plural paths that may be used.

SUMMARY

According to an aspect of the invention, an apparatus includes a signal generator configured to generate a first signal corresponding to an amount of residual chromatic dispersion that occurs in a light signal transmitted from the optical transmission device to a downstream device, and a superimposer configured to superimpose the first signal on the light signal transmitted from the optical transmission device and transmit the light signal superimposed by the first signal to the downstream device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 illustrates the relationship between a residual chromatic dispersion value after converted to a two's complement and a frequency.

FIG. 11A illustrates the relationship between a residual chromatic dispersion value and a frequency.

FIG. 11B illustrates the relationship between a residual chromatic dispersion value and a frequency.

DESCRIPTION OF EMBODIMENTS

Hereinafter, embodiments of an optical transmission device and an optical switch device, disclosed in this application, will be described in detail with reference to the drawings. It is to be noted that a wavelength selective switch (WSS) is used as one example of the optical switch device in the following description, but the scope of this application is not restricted by the following embodiments.

First Embodiment

Figure 1:
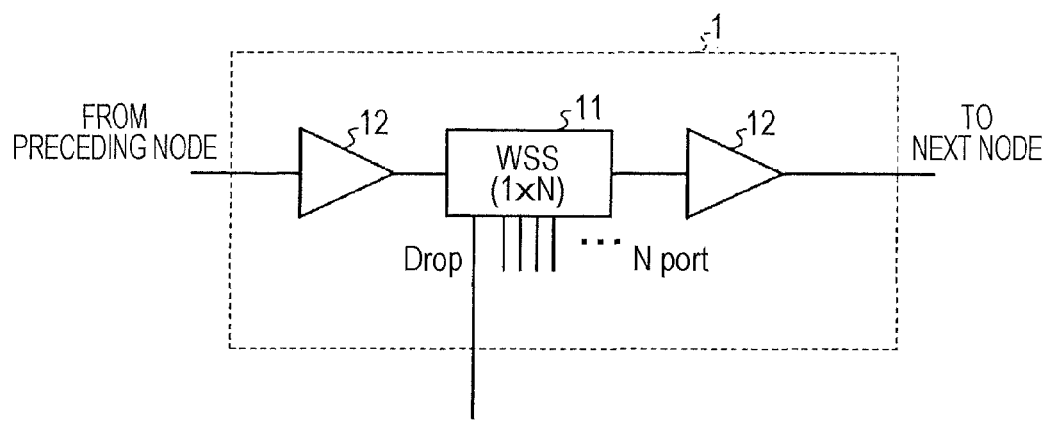
FIG. 1 illustrates an exemplary configuration of an OADM node.

FIG. 1 illustrates an exemplary configuration of an OADM node including a WSS according to a first embodiment. In FIG. 1, an OADM node 1 operates as a relay device used in a WDM optical network, and it has the function of relaying a light signal from a preceding node to a next node and the function of changing over a path for each wavelength. The OADM node 1 includes a WSS 11 having 1×N ports, optical amplifiers 12 in input and output stages, etc. The WSS 11 executes a process of allowing a light signal in an optical fiber to pass therethrough, a process of dropping or adding a light signal on a per-wavelength basis.

Figure 2:
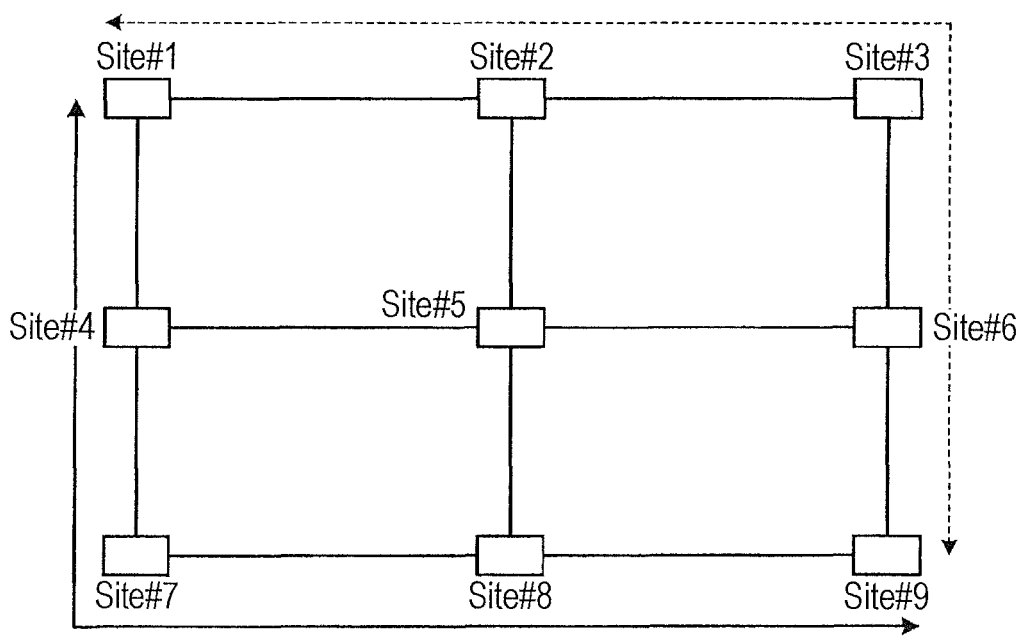
FIG. 2 illustrates one example of a mesh-type optical network.
Figure 3:
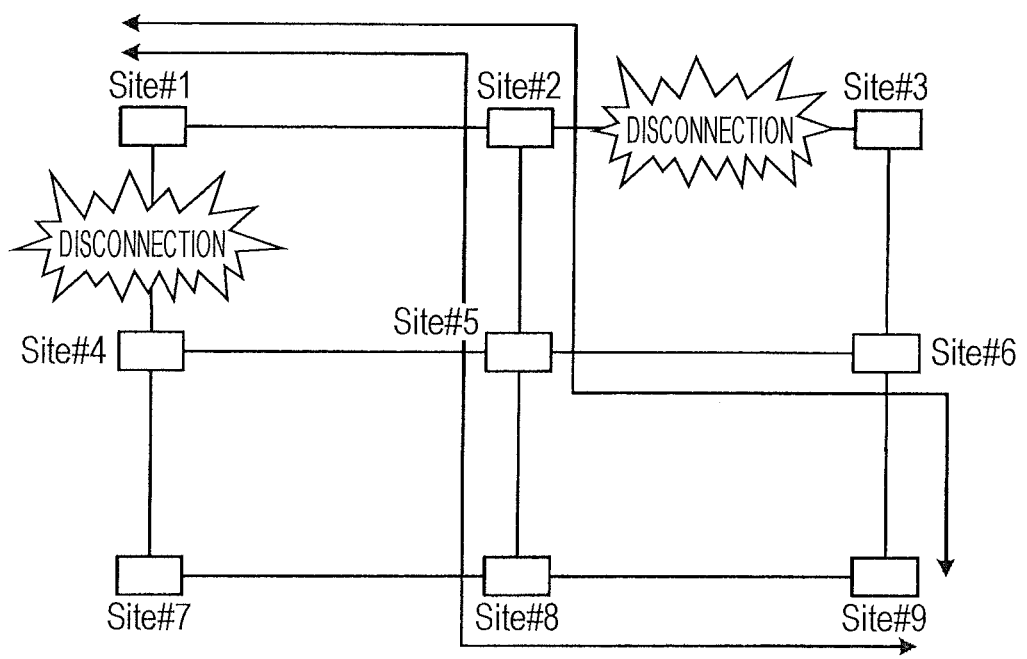
FIG. 3 illustrates one example of the mesh-type optical network.

Prior to explaining the operation of the WSS according to the first embodiment, a mesh-type optical network, i.e., a network in which the WSS operates, is described. FIG. 2 illustrates one example of the mesh-type optical network. Sites #1 to #9 are each an OADM node. In the optical network illustrated in FIG. 2, it is supposed, for example, that a light signal is transmitted along a path passing through Sites #1, #4, #7, #8 and #9 in a steady operation, and that Sites #1, #2, #3, #6 and #9 are set as a bypassing path in the event of a failure. On such a condition, even when failures occur, for example, in both the path in the steady operation and the bypassing path in the event of the failure, there are plural bypassing paths (see FIG. 3), such as a path through Sites #1, #2, #5, #8 and #9, in the mesh-type optical network of FIG. 2. Thus, the mesh-type optical network may have a very useful network configuration from the viewpoint of being adaptable and coping with, e.g., secondary and tertiary failures.

Figure 4A:
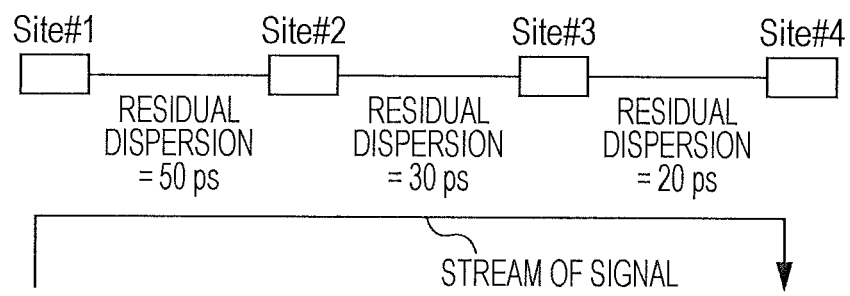
FIG. 4A illustrates one example of a path of a light signal in an optical network.

The operation of the WSS according to the first embodiment is described below. FIG. 4A illustrates one example of a path of a light signal in an optical network. In FIG. 4A, it is supposed that the light signal is relayed in the order of Site #1, Site #2, Site #3, and Site #4. Further, in this first embodiment, it is supposed, for example, that a residual chromatic dispersion value between Site #1 and Site #2 is 50 ps, a residual chromatic dispersion value between Site #2 and Site #3 is 30 ps, and a residual chromatic dispersion value between Site #3 and Site #4 is 20 ps.

Figure 4B:
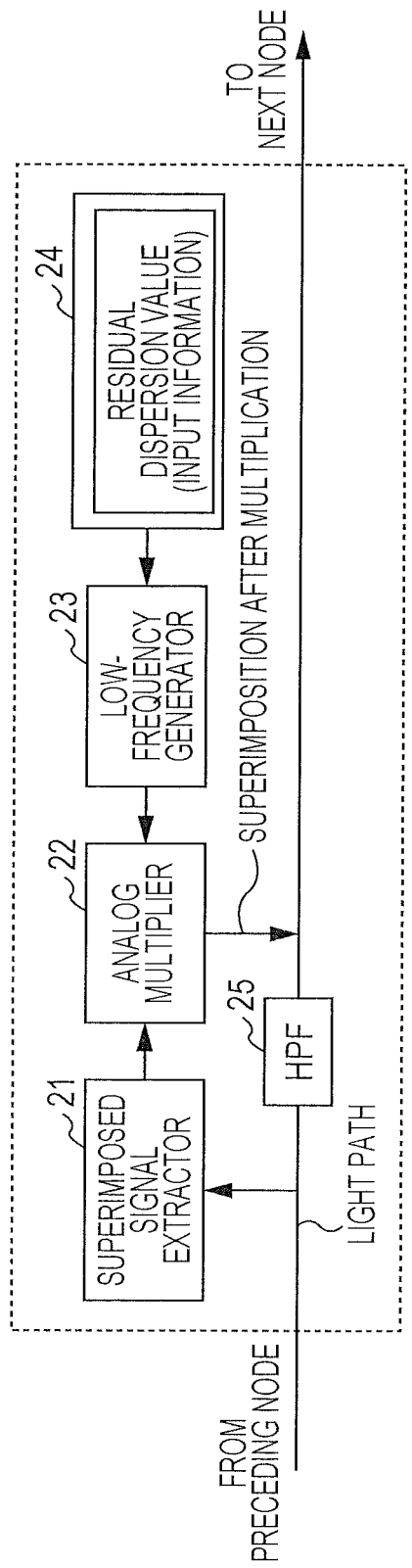
FIG. 4B illustrates an exemplary configuration of a wavelength selective switch (WSS) according to a first embodiment.
Figure 4C:
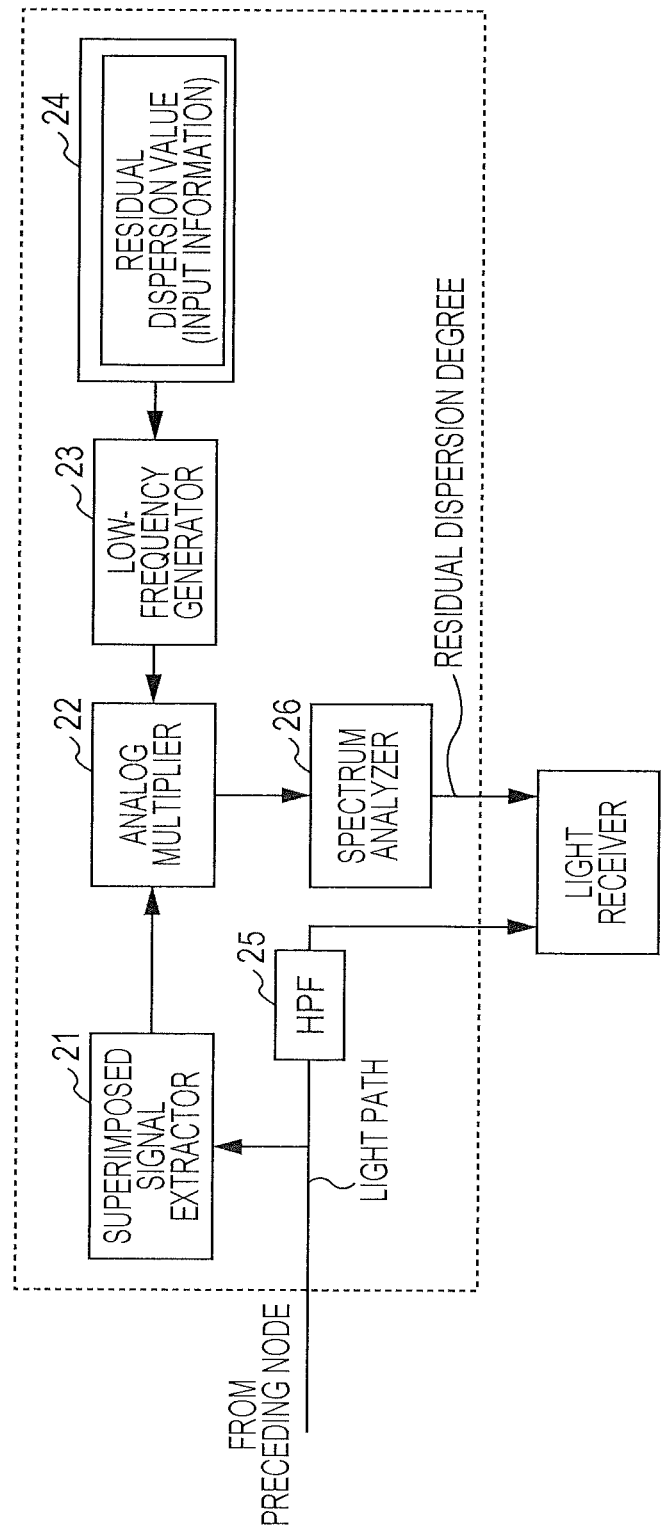
FIG. 4C illustrates an exemplary configuration of a WSS according to the first embodiment.

FIG. 4B illustrates an exemplary configuration of a WSS in an OADM node at each of Sites #1 to #3, and FIG. 4C illustrates an exemplary configuration of a WSS in an OADM node at Site #4. In FIG. 4B, the WSS at each of Site #1 to #3 includes a superimposed signal extractor 21, an analog multiplier 22, a low-frequency generator 23, a memory 24, and a high pass filter (HPF) 25. In FIG. 4C, the WSS at Site #4 further includes a spectrum analyzer 26 in addition to the above-described configuration.

The superimposed signal extractor 21 extracts a superimposed signal (low-frequency signal component) that is superimposed on a signal incoming from the upstream. The memory 24 previously holds therein, as input information, a known residual chromatic dispersion value (i.e., a residual chromatic dispersion value between the preceding Site and the current Site). The low-frequency generator 23 generates a low-frequency signal corresponding to the residual chromatic dispersion value that is held in the memory 24. The analog multiplier 22 multiplies the superimposed signal, which has been extracted by the superimposed signal extractor 21, by the low-frequency signal generated from the low-frequency generator 23. The HPF 25 allows a high-frequency component of the light signal to pass therethrough. Thus, the low-frequency signal superimposed on the light signal may be removed by executing, on the light signal, low-frequency modulation in opposite phase such that the low-frequency signal component included in the light signal transmitted from the upstream is cancelled. In such a way, a function equivalent to that of a HPF, which passes the high-frequency component of the light signal therethrough, can be realized. Alternatively, only a particular low-frequency signal may be selected and removed from plural low-frequency signals.

The spectrum analyzer 26 extracts a maximum frequency from a multiplication result of the analog multiplier 22 of the WSS in the final stage (Site #4) and determines a residual chromatic dispersion degree in the path illustrated in FIG. 4A. In this first embodiment, the WSS at Site #4 is separately described and has a configuration different from the WSSs at Sites #1 to #3 for convenience of explanation. An actual WSS at each Site is supposed to have the functions of both the WSSs (i.e., the same configuration). Further, it is premised that the memories 24 at Sites #1, #2, #3 and #4 previously hold therein 0 ps, 50 ps, 30 ps and 20 ps as residual chromatic dispersion values (input information), respectively.

In FIGS. 4A to 4C, the WSS according to the first embodiment superimposes an intensity-modulated signal corresponding to the residual chromatic dispersion value of each span on the light signal in the optical network. Thus, each time the light signal passes through the OADM node including the optical switch, e.g., the WSS, the low-frequency signal superimposed in the preceding OADM node is multiplied by a low-frequency signal corresponding to the residual chromatic dispersion value of the span, whereby superimposition of the low-frequency signal (multiplication result) on the light signal is repeatedly executed. Further, the residual chromatic dispersion degree is determined by extracting a maximum frequency from a low-frequency signal component superimposed in the above-described processing. FIGS. 4B and 4C illustrate, for example, the case where the analog multiplier 22, the low-frequency generator 23, and the spectrum analyzer 26 are disposed inside the WSS. Those components may be disposed outside the WSS when the optical transmission device is constituted.

Figure 5:
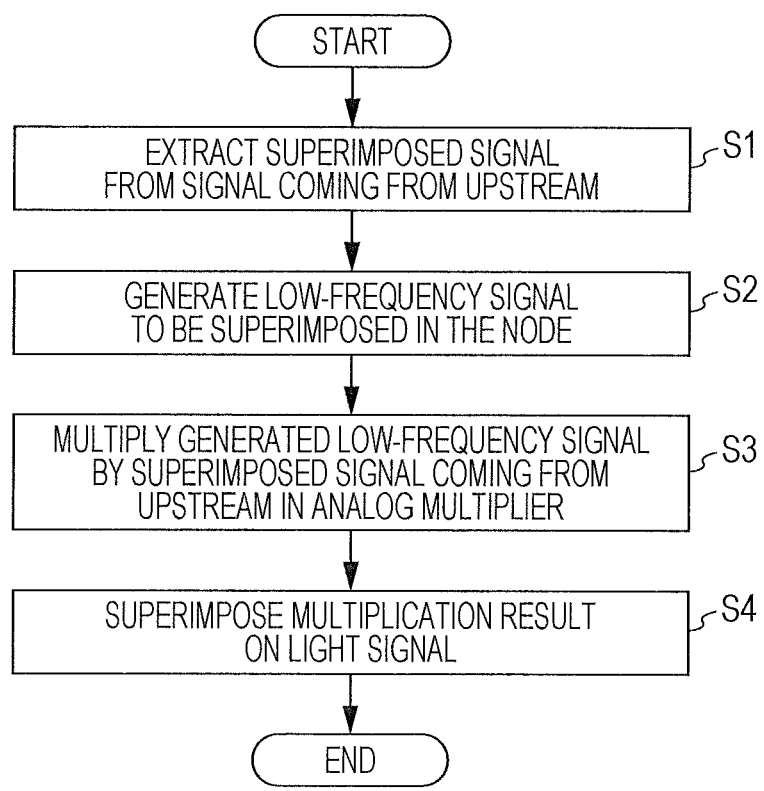
FIG. 5 is a flowchart to explain an operation of the WSS according to the first embodiment.

The operation of the WSS according to the first embodiment will be described in detail below with reference to the drawing. FIG. 5 is a flowchart to explain the operation of the WSS according to the first embodiment. In this first embodiment, for example, each OADM node converts the residual chromatic dispersion value held in its memory 24 (i.e., the residual chromatic dispersion value in the span from the preceding OADM node to the OADM node) to a predetermined frequency (low-frequency signal) and superimposes the low-frequency signal on the light signal. The low-frequency generator 23 generates, for example, a low-frequency signal of 10 Hz when the residual chromatic dispersion value is 10 ps, and a low-frequency signal of 100 Hz when the residual chromatic dispersion value is 100 ps.

In FIG. 5, first, the superimposed signal extractor 21 of the WSS at each Site extracts a low-frequency superimposed signal from a signal coming from the upstream (S1). For example, a filter is provided in the WSS and extracts the low-frequency superimposed signal. It is to be noted that the superimposed signal is not extracted at Site #1.

On the other hand, the low-frequency generator 23 generates a low-frequency signal corresponding to the residual chromatic dispersion value (input information) that is held in the memory 24 (S2). At Site #1, the low-frequency signal is not generated because the residual chromatic dispersion value held in the memory 24 is 0 ps. At Sites #2 to #4, low-frequency signals of 50 Hz, 30 Hz and 20 Hz are generated, respectively.

The analog multiplier 22 multiplies the superimposed signal, which has been extracted by the superimposed signal extractor 21, by the low-frequency signal generated from the low-frequency generator 23 (S3). Thus, the analog multiplier 22 multiplies the low-frequency signal component, which has been superimposed upstream of the node and which has been extracted by the superimposed signal extractor 21, by the low-frequency signal generated from the low-frequency generator 23. Supposing, for example, that the low-frequency signal superimposed upstream of the node is "A sin(x)t (residual chromatic dispersion value: x [ps]) and the low-frequency signal superimposed in the node is "A sin(y)t (residual chromatic dispersion value: y [ps]), a low-frequency signal after the multiplication is expressed by the following formula (1). As a result, a frequency component of "x+y" (e.g., 50 Hz at Site #2, 80 Hz at Site #3, and 100 Hz at Site #4) are generated. C in the following formula represents a frequency component corresponding to a difference (i.e., a differential frequency).

$$A \sin(x)t \times A \sin(y)t = B \cos(x+y)t + C \tag{1}$$

Thereafter, in the WSS, the multiplication result (low-frequency signal) of the analog multiplier 22 is superimposed on the output signal from the HPF 25 (S4), and a signal superimposed with the low-frequency signal is output to the next OADM node. In the WSS, for example, the intensity-modulated low-frequency signal is superimposed. The intensity-modulated low-frequency signal is obtained by intensity-modulating light power at a frequency that is given by employing the function of attenuating the light power. In addition, the superimposed signal may be used for a phase-modulated low-frequency signal or a differential phase-modulated of a low-frequency signal instead of the intensity-modulated low-frequency signal. And Subsequently, in this first embodiment, each time the light signal passes through the OADM node in the path illustrated in FIG. 4A, the above-described operations S1 to S4 are repeated, and the spectrum analyzer 26 at Site #4 detects a maximum frequency of the signal output from the analog multiplier 22. Further, a residual chromatic dispersion degree (residual chromatic dispersion degree=maximum frequency) is determined from the detected maximum frequency. Thereafter, the spectrum analyzer 26 provides the residual chromatic dispersion degree, determined as described above, to the light receiver to which the signal is dropped from the WSS at Site #4.

In this first embodiment, as described above, the WSS in each OADM node superimposes the low-frequency signal (intensity-modulated signal) corresponding to the residual chromatic dispersion value of each span on the light signal in the path of the optical network. At that time, the WSS in each OADM node multiplies the low-frequency signal superimposed in the preceding OADM node by the low-frequency signal corresponding to the residual chromatic dispersion value in the span. Further, each time the light signal passes through the OADM node, a process of superimposing the low-frequency signal, provided as the above-mentioned multiplication result, on the light signal is repeatedly executed. Thus, the light receiver is notified of the residual chromatic dispersion degree with a simple circuit even when there are plural or infinite bypassing paths such as in the mesh-type optical network.

Second Embodiment

In the first embodiment described above, because the residual chromatic dispersion take a "+" value in most spans in the WDM transmission, it is not supposed that the residual chromatic dispersion take a "−" value. In a second embodiment, the residual chromatic dispersion is expressed by using signs "+" and "−".

Figure 6A:
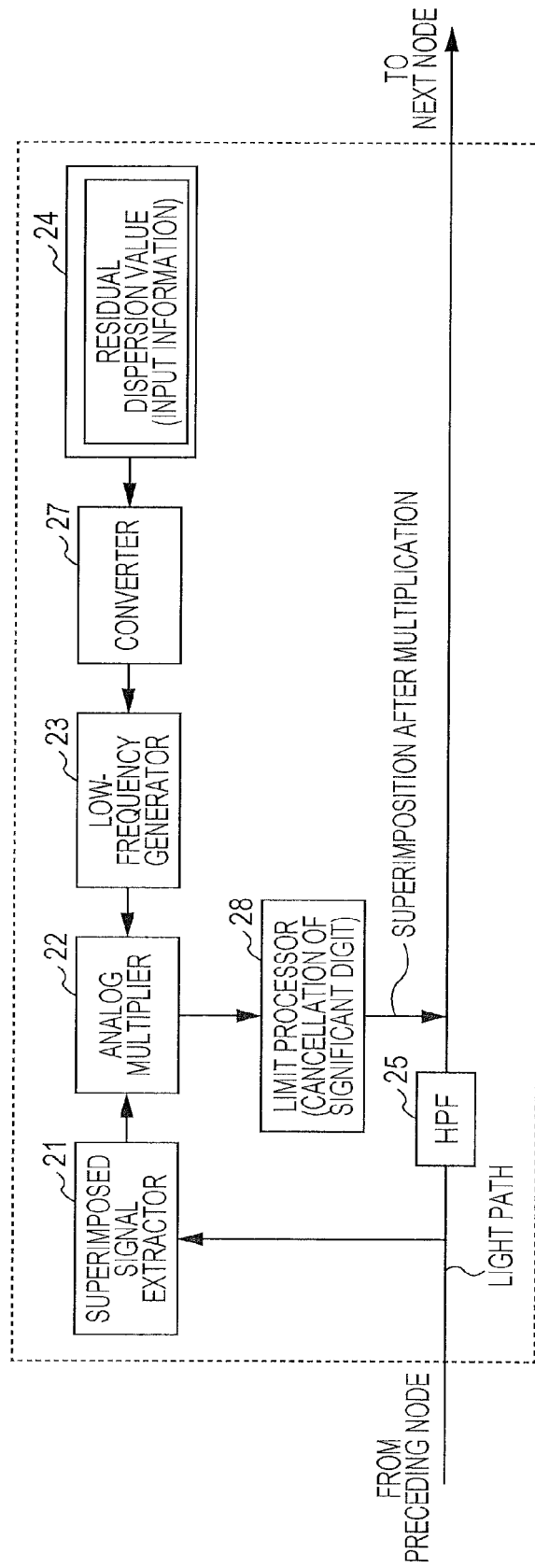
FIG. 6A illustrates an exemplary configuration of a WSS according to a second embodiment.
Figure 6B:
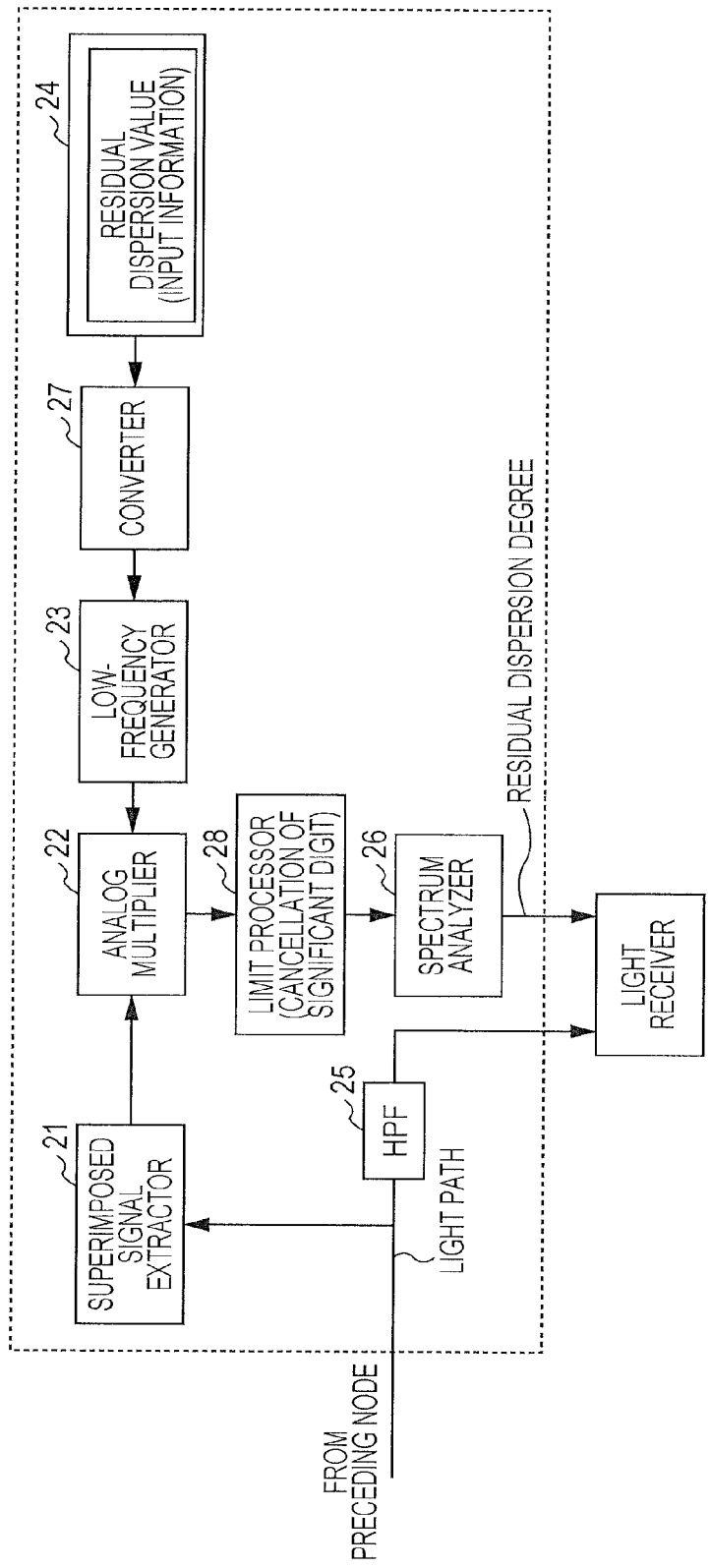
FIG. 6B illustrates an exemplary configuration of a WSS according to the second embodiment.

FIG. 6A illustrates an exemplary configuration of a WSS in an OADM node at each of Sites #1 to #3, and FIG. 6B illustrates an exemplary configuration of a WSS in an OADM node at Site #4. It is to be noted that the same components in FIGS. 6A and 6B as those in the first embodiment are denoted by the same reference numerals and the description of those components is omitted. The path of the light signal in the above-described first embodiment, illustrated in FIG. 4A, is also used in this second embodiment. The WSS according to the second embodiment includes a converter 27 and a limit processor 28 in addition to the configuration of the first embodiment. The converter 27 converts a residual chromatic dispersion value (input information) read from the memory 24 to a two's complement, and outputs a value after the conversion to the two's complement to the low-frequency generator 23. FIG. 7 illustrates the relationship between a residual chromatic dispersion value and a frequency after the conversion to the two's complement (in the case of 8 bits). The limit processor 28 executes a limit process for, e.g., cancellation of significant digit in the multiplication result with the analog multiplier 22. FIG. 7 illustrates the relationship between a residual chromatic dispersion value and a frequency. The residual chromatic dispersion value may be expressed using, e.g., an intensity-modulated signal or a phase-modulated signal of a low frequency.

Figure 8:
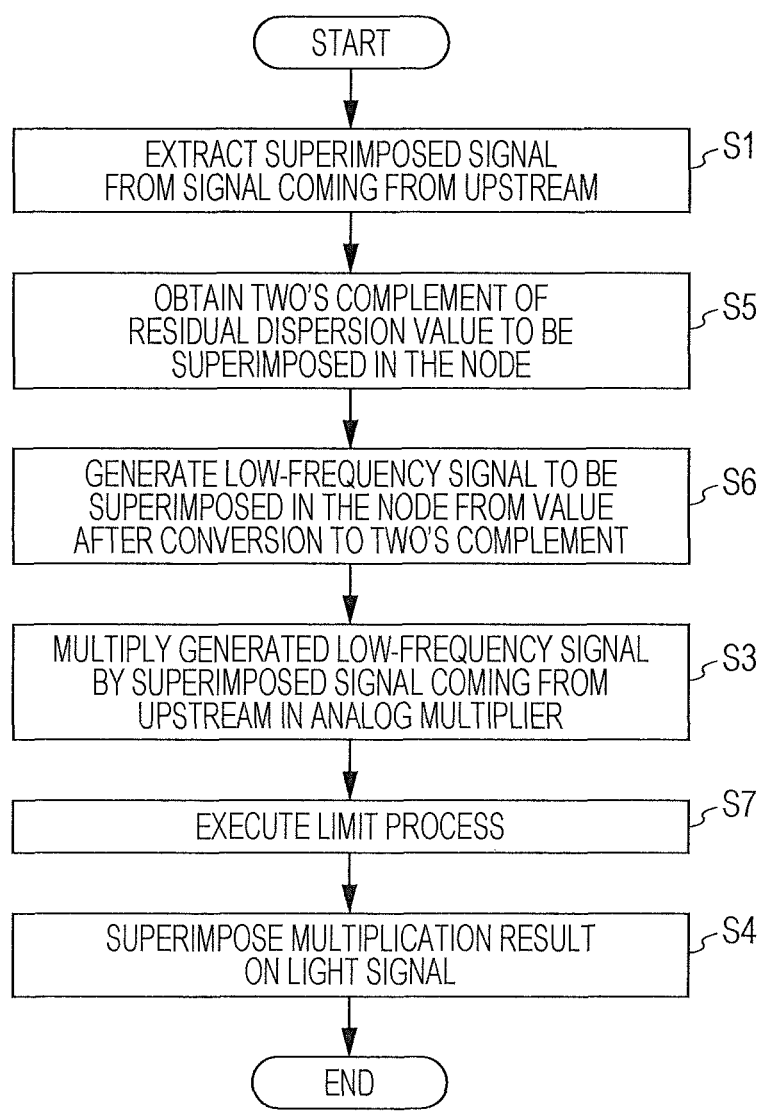
FIG. 8 is a flowchart to explain an operation of the WSS according to the second embodiment.

The operation of the WSS according to the second embodiment will be described in detail below with reference to the drawing. FIG. 8 is a flowchart to explain the operation of the WSS according to the second embodiment. In this second embodiment, for example, a value resulting from executing a two's complement conversion process on the residual chromatic dispersion value held in the memory 24 is converted to a predetermined frequency (low-frequency signal), which is then superimposed on the light signal. The low-frequency generator 23 generates, for example, a low-frequency signal having a frequency illustrated in FIG. 7 (in the case of 8 bits).

In FIG. 8, first, the superimposed signal extractor 21 of the WSS at each Site extracts a low-frequency superimposed signal from a signal coming from the upstream (S1). On the other hand, the converter 27 reads the residual chromatic dispersion value (input information) held in the memory 24 and executes the two's complement conversion process (S5). In addition, the low-frequency generator 23 generates a low-frequency signal corresponding to a value that is obtained after executing the two's complement conversion on the residual chromatic dispersion value (S6, see FIG. 7). Then, the analog multiplier 22 multiplies the superimposed signal, which has been extracted by the superimposed signal extractor 21, by the low-frequency signal generated from the low-frequency generator 23 (S3). Further, the limit processor 28 executes the predetermined limit process (S7). Thereafter, in the WSS, the low-frequency signal after being subjected to the limit process is superimposed on the output signal of the HPF 25 (S4), and a signal superimposed with the low-frequency signal is output to the next OADM node. Subsequently, in this second embodiment, each time the light signal passes through the OADM node in the path illustrated in FIG. 4A, the above-described operations S1 to S4 are repeated, and the spectrum analyzer 26 at Site #4 detects a maximum frequency of the signal output from the analog multiplier 22. Further, a residual chromatic dispersion degree (residual chromatic dispersion degree=maximum frequency) is determined from the detected maximum frequency. Thereafter, the spectrum analyzer 26 provides the residual chromatic dispersion degree, determined as described above, to the light receiver to which the signal is dropped from the WSS at Site #4.

In this second embodiment, as described above, the residual chromatic dispersion value is expressed by using signs. Therefore, the residual chromatic dispersion value may be provided as a more accurate value to the light receiver.

Third Embodiment

A third embodiment is intended to further reduce a cost by using a single-frequency generator.

Figure 9:
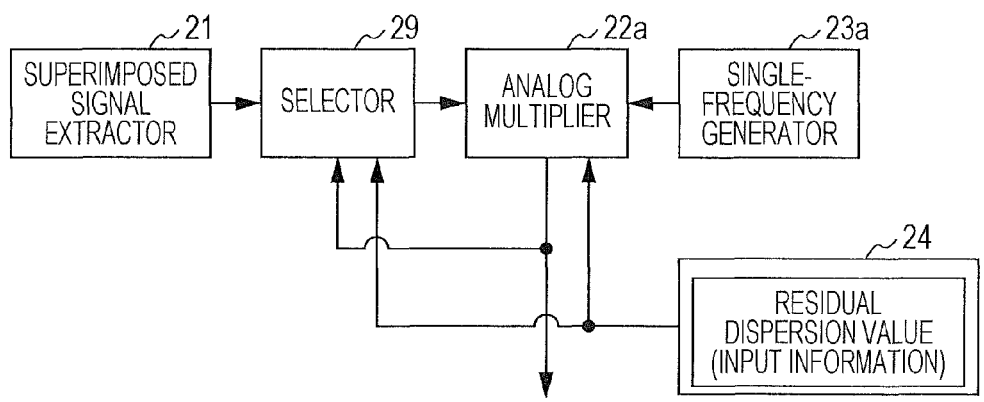
FIG. 9 illustrates an exemplary configuration of a WSS according to a third embodiment.

FIG. 9 illustrates an exemplary configuration of a WSS according to the third embodiment. It is to be noted that the same components in FIG. 9 as those in the first embodiment are denoted by the same reference numerals and the description of those components is omitted. The following description is made about the configuration and the processing in the third embodiment in points differing from those in the first and second embodiments. In FIG. 9, the WSS according to the third embodiment includes a single-frequency generator 23a, a selector 29, and an analog multiplier 22a.

The single-frequency generator 23a generates, for example, a signal of 1 Hz. The selector 29 selectively outputs one of an output signal of the superimposed signal extractor 21 and an output signal of the analog multiplier 22a depending on the residual chromatic dispersion value held in the memory 24. For example, when the residual chromatic dispersion value is 10 ps, the selector 29 selects and outputs the output signal of the superimposed signal extractor 21 once and then selects and outputs the output signal of the analog multiplier 22a nine times in succession. The analog multiplier 22a multiplies the output signal of the selector 29 by the signal of 1 Hz generated from the single-frequency generator 23a the number of times corresponding to the residual chromatic dispersion value held in the memory 24. For example, when the residual chromatic dispersion value is 10 ps, the analog multiplier 22a multiplies the output signal of the selector 29 by the signal of 1 Hz ten times. In that case, the output signal of the superimposed signal extractor 21 is multiplied by the signal of 1 Hz at the first time, and a feedback signal from the analog multiplier 22a itself is multiplied at each of the second to tenth times. As a result, a low-frequency signal of 10 Hz is superimposed when the residual chromatic dispersion value is 10 ps.

In this third embodiment, as described above, since the single-frequency generator is used, a similar advantageous effect to that in the first embodiment can be obtained while a cost reduction of the WSS is realized.

Figure 10:
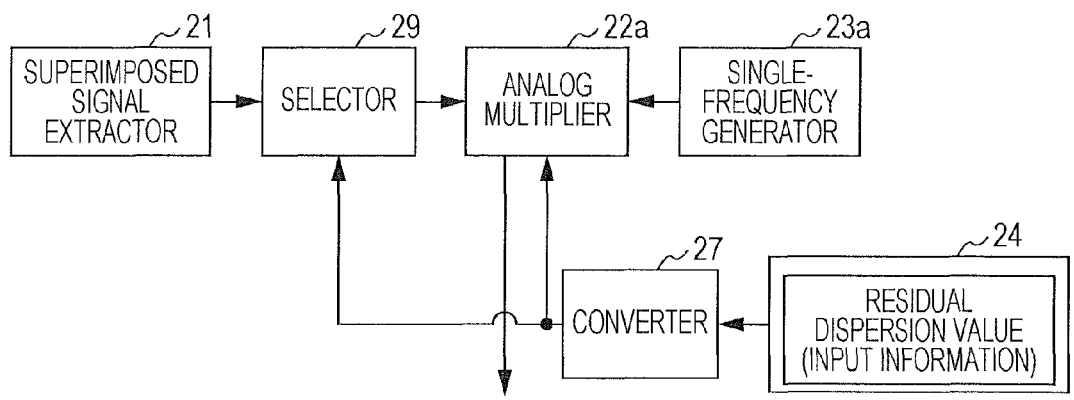
FIG. 10 illustrates an exemplary configuration of a WSS according to the third embodiment.

The configuration and the processing illustrated in FIG. 9 may be similarly applied to the second embodiment described above. FIG. 10 illustrates an exemplary configuration of a WSS differing from that illustrated in FIG. 9. In the configuration of FIG. 10, the converter 27 converts the residual chromatic dispersion value (input information) read from the memory 24 to a two's complement, and outputs a value obtained after the two's complement conversion to both the selector 29 and the analog multiplier 22a. Further, the selector 29 selectively outputs one of the output signal of the superimposed signal extractor 21 and the output signal of the analog multiplier 22a depending on the value of the two's complement. The analog multiplier 22a multiplies the output signal of the selector 29 by the signal of 1 Hz generated from the single-frequency generator 23a the number of times corresponding to the value of the two's complement.

Fourth Embodiment

In the first and second embodiments described above, the low-frequency generator 23 outputs the low-frequency signal in a one-to-one correspondence with the residual chromatic dispersion value (e.g., 1 Hz in the case of 1 ps and 10 Hz in the case of 10 ps). In the fourth embodiment, a certain range of the residual chromatic dispersion value is expressed by one frequency signal.

FIG. 11A illustrates the relationship between a residual chromatic dispersion value and a frequency, and corresponds to, e.g., the first embodiment. For example, the low-frequency generator 23 outputs a signal of a frequency fo (fo: arbitrary frequency) when the residual chromatic dispersion value is 0 to 50 ps, and outputs a signal of a frequency 2×fo when the residual chromatic dispersion value is 51 to 100 ps. In other words, the low-frequency generator 23 outputs one frequency signal per step of 50 ps. As a result, frequency may be efficiently used.

FIG. 11B illustrates the relationship between a residual chromatic dispersion value and a frequency, and corresponds to, e.g., the second embodiment. For example, the two's complement is expressed in four bits. The low-frequency generator 23 outputs a signal of a frequency fo when the residual chromatic dispersion value is 0 to 50 ps, and outputs a signal of a frequency 15×fo when the residual chromatic dispersion value is −1 to −50 ps (per step of 50 ps). As a result, the number of bits for the two's complement is greatly reduced in comparison with that in the second embodiment, and frequency may be efficiently used.

Thus, in this fourth embodiment, since one frequency signal corresponds to a certain range of the residual chromatic dispersion values, frequency is efficiently used. The relationships illustrated in FIGS. 11A and 11B may be applied to the third embodiment. When the fourth embodiment is applied to the third embodiment, the multiplication is executed the same number of times per step of 50 ps.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus comprising:
   a signal extractor configured to extract a first signal from a light transmitted to the apparatus from an upstream device, the first signal indicating of an amount of residual chromatic dispersion that occurred in the light due to transmission of the light to the upstream device from a device upstream of the upstream device;
   a signal generator configured to generate a second signal indicating an amount of residual chromatic dispersion that occurred in the light due to transmission of the light to the apparatus from the upstream device; and
   a superimposer configured to superimpose a third signal, obtained by using the first signal and the second signal and thereby indicating the amount of residual chromatic dispersion indicated by the first signal and the amount of residual chromatic dispersion indicated by the second signal, on the light, and to transmit the light having the third signal superimposed thereon to a downstream device.

2. The apparatus according to claim 1, further comprising:
a converter that converts the amount of residual chromatic dispersion that occurred in the light due to transmission of the light to the apparatus from the upstream device to a two's complement,
wherein the signal generator generates the second signal to have a frequency corresponding to the converted residual chromatic dispersion.

3. The apparatus according to claim 2,
wherein the second signal generated by the signal generator is a single-frequency signal.

4. The apparatus according to claim 1,
wherein the second signal generated by the signal generator is a single-frequency signal.

5. The apparatus according to claim 1,
wherein the second signal is set to have a specific frequency when the amount of residual chromatic dispersion that occurred in the light due to transmission of the light to the apparatus from the upstream device is within a first range, and the second signal is set to have a multiple of the specific frequency when the amount of residual chromatic dispersion that occurred in the light due to transmission of the light to the apparatus from the upstream device is within a second range.

6. The apparatus according to claim 1, wherein the third signal is obtained by multiplying the first signal and the second signal together.

7. An apparatus comprising:
a signal extractor configured to extract a first signal from a light signal transmitted from an upstream device to the apparatus, the first signal having been superimposed on the light signal by the upstream device and corresponding to residual chromatic dispersion that occurred in the light signal due to transmission of the light signal to the upstream device from a device upstream of the upstream device;
a signal generator configured to generate a second signal corresponding to residual chromatic dispersion that occurred in the light signal due to transmission of the light signal from the upstream device to the apparatus; and
a superimposer configured to superimpose a third signal, which is obtained by multiplying the first signal by the second signal, on the light signal, wherein the light signal having the third signal superimposed thereon is transmitted by the apparatus to a downstream device.

8. An apparatus, comprising:
a signal extractor configured to extract a first signal from a light transmitted to the apparatus from an upstream device, the first signal indicating an amount of residual chromatic dispersion that occurred in the light due to transmission of the light to the upstream device from a device upstream of the upstream device;
a signal generator configured to generate a second signal indicating residual chromatic dispersion in the light that occurred in a transmission span from the upstream device to the apparatus; and
a superimposer configured to superimpose a third signal, obtained by using the first signal and the second signal and thereby indicating the amount of residual chromatic dispersion indicated by the first signal and the amount of residual chromatic dispersion indicated by the second signal, on the light, and to transmit the light having the third signal superimposed thereon to a downstream device,
wherein the apparatus is a node in a wavelength division multiplexing (WDM) network.

9. The apparatus according to claim 8,
wherein the second signal is a low-frequency signal.

10. The apparatus according to claim 8, wherein the third signal is obtained by multiplying the first signal and the second signal together.

* * * * *